Jan. 2, 1951
P. J. ROWE
2,536,097
CONTINUOUS PROCESS FOR MANUFACTURE
OF BASIC COPPER AMMONIUM SULFATE
Filed Dec. 27, 1948
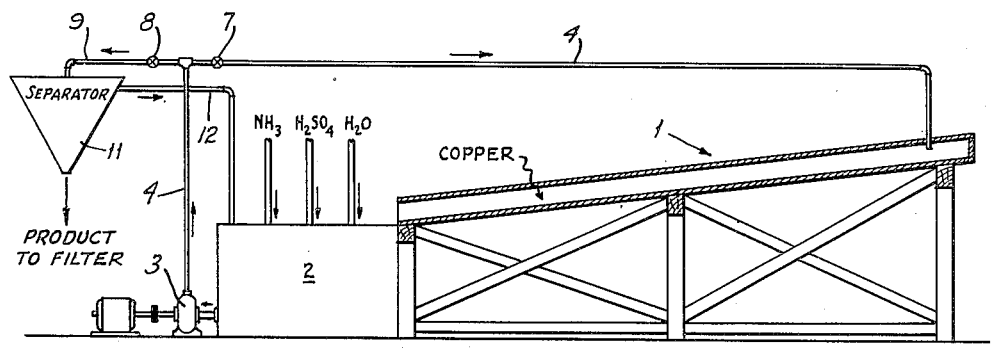
INVENTOR.
Percy John Rowe
BY
ATTORNEY Patented Jan. 2, 1951

2,536,097

UNITED STATES PATENT OFFICE 2,536,097

CONTINUOUS PROCESS FOR MANUFACTURE OF BASIC COPPER AMMONIUM SULFATE

Percy John Rowe, Martinez, Calif., assignor to The Mountain Copper Company, Ltd., a corporation of Great Britain Application December 27, 1948, Serial No. 67,485

4 Claims. (Cl. 23—125)

This application is a continuation in part of my application Serial No. 771,697 filed September 2, 1947.

This invention relates to the manufacture of copper compounds such as basic copper ammonium sulfate, copper hydroxide, and copper oxide from metallic copper.

I have discovered that, by passing an aqueous solution of ammonia over copper in the presence of available oxygen, a solution of a complex copper ammonium compound is formed in which the copper is present as cupric copper. If the application of this ammoniacal solution is continued, in the presence of oxygen, there forms upon the surface of the metallic copper an insoluble film which, depending upon the temperature, is either copper oxide or copper hydroxide. If this film is removed, a fresh metallic copper surface is exposed which is readily acted upon by the solution. If ammonium sulfate is present in the ammoniacal solution within certain limits, a basic copper ammonium sulfate is produced which is a new compound.

This process can readily be operated continuously by providing a mass of copper, a suitable source of oxygen as air, and replacing the reagents which are converted into the desired product. The copper compound is recovered, dried, and comminuted to a desired fineness if not initially satisfactory. If the agitation is sufficiently active, the product is initially of a small particle size making it particularly useful as an insecticide and fungicide, and for manufacture of copper naphthenate and other copper salts.

In its simplest form, one can practice the process of this invention by bringing together a finely divided mass of metallic copper, an aqueous solution of ammonia and oxygen, as by exposure to atmosphere, the copper being dissolved until the solution becomes saturated with cupric ion. As the solution approaches or reaches this saturation point, however, a film is formed on the surface of the copper which can be removed to provide a product and a fresh copper for action by the solution.

Additionally, I have found that if ammonium sulfate is also present, certain new and beneficial results follow. For example, by controlling the relative amounts of ammonium hydroxide and ammonium sulfate in the solution, I am able to control the chemical composition of the film. Thus, where the copper is treated with a solution containing a weight of ammonium sulfate in an amount more than substantially equal to the weight of ammonia dissolved in the solution, I can produce an alkaline copper ammonium sulfate having substantially the composition corresponding to the formula,

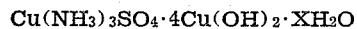

where X is of a value from about 0.4 to 2; the compound is somewhat difficult to dry so that a precise determination of the water of crystallization is not an easy matter. For convenience, this compound will be referred to as a basic copper ammonium sulfate. This compound is powder or chalky blue in color and appearance, has a low bulk density, a specific gravity of about 2.3, and is almost completely insoluble in water. Its chemical composition is substantially constant over a considerable range in the relative proportion of $NH_3$ and $(NH_4)_2SO_4$ in the solution. As produced, the material is very finely divided solid and of a nearly uniform size so that it can be separated readily from the solution. Being of a non-gelatinous nature, it can be filtered readily. It is an excellent intermediate for preparation of various other copper compounds.

It is an object of this invention to provide a simple and novel process for manufacture of various copper compounds.

Another object of this invention is to provide a process for manufacture of a compound corresponding to the formula,

where X is of a value from about 0.4 to 2.

The invention includes other objects and features of advantage some of which, together with the foregoing, will appear hereinafter wherein the present preferred manner of practicing this invention is set forth in conjunction with the drawing wherein the single figure is a schematic representation of one form of apparatus which can be utilized to practice the invention.

The process of this invention can be practiced with various apparatus arrangements and in the drawing I have shown a simple and typical arrangement which can be employed. An inclined launder 1 is provided and is covered with suitable copper (not shown) providing an adequately large surface for contact with the solution. The launder discharges solution into a tank 2 where it is collected for removal by pump 3 and return through line 4 to the head of the launder; a portion of the liquid carrying the copper compound particles in suspension is taken off through line 9, valves 7 and 8 being suitably adjusted to this end. The bleed-off liquid is passed to a separator 11 from which the product is removed, clear liquid being returned by line 12 to tank 2. The product can be filtered, dried, or otherwise processed as desired.

In one operation, I used a steel launder 16 feet long by 9 inches wide and 9 inches deep and so inclined that the feed end was 5 inches higher than the discharge end. About 200 pounds of scrap copper wire and strap were placed in the launder and evenly distributed to cover about 12 feet of the length of the launder about 5 inches deep. This launder was erected so as to discharge into a 50 gallon tank. The tank was fitted with a bottom discharge direct to the suction of a 60 gallon per minute pump which raised the discharged solution from the tank to the feed end of the launder, thus effecting passage of a continuous stream of solution over the copper.

The practice of the invention is not limited to the apparatus disclosed, and in another operation, carried on in accordance with the present invention, a cylindrical tumbling drum was filled with 80 pounds of two-inch lengths of No. 12 wire to provide a mass of copper having a relatively large surface. Nine gallons of an aqueous solution of ammonia (3% $NH_3$) were then pumped in and discharged as a shower over the copper mass in the drum at a temperature between 70° and 80° F. The drum was provided with loosely fitting end covers to reduce the loss of ammonia and still permit air to pass over the wet copper. The drum was rotated and the copper mass was thus continuously agitated with such violence that the film of copper hydroxide which formed on the surface of the copper was broken loose and displaced, the particles being swept out in the stream of ammonia solution from which it was separated, the ammonia solution being returned to the closed vessel. After five hours, 6½ pounds of copper hydroxide had been recovered.

The strength of the ammoniacal solution employed in production of the copper oxide or copper hydroxide can vary over relatively wide limits and one can use solutions containing as little as one-half of 1% of ammonium hydroxide up to a solution having such concentration that it can be characterized as aqua-ammonia. Generally, the solution should contain about 3% of $NH_3$ to secure a good yield. Greater amounts are conducive to loss of $NH_3$ from the solution.

At temperatures above about 87° F. the process can form mixtures of cupric hydroxide and cupric oxide, as is evidenced by the color of the precipitate changing from blue to greenish blue; as the temperature is increased and agitation continued, the product becomes increasingly dark to dark brown and is presently presumed to be a mixture of copper oxide and copper oxide monohydrate, $CuO \cdot H_2O$—$CuO$. Blue cupric hydroxide can be recovered from solutions whose temperatures are considerably above 87° F. when the precipitate is removed from the solution substantially as it is formed; the commercially desirable blue color of the blue cupric hydroxide precipitate can be retained, even though the temperature of the solution is as high as 100° F. and slightly higher, if the precipitate is removed immediately upon formation and placed in water or washed with water and dried. It is desirable to remove the precipitate as soon as possible after formation, preferably within an hour or two to insure retention of the desired blue color. When the precipitate is allowed to remain in contact with the solution over prolonged periods, say 4 to 5 hours, the temperature of the solution should not exceed 87° F. For usual commercial operations, I prefer to employ a temperature in the range of ordinary atmospheric temperatures, e. g. 55° to 85° F.

Above about 140° F., copper oxide is formed as the product and when copper oxide is desired as the product, generally a temperature of 140° F. must be employed to insure complete absence of the hydroxide. Since utilization of temperatures of this order introduce an ammonia vaporization problem, it may be preferable to form the hydroxide first and then heat this to form the oxide.

To prepare basic copper ammonium sulfate, a solution was prepared by adding to water sufficient $NH_3$ gas and $H_2SO_4$ to make 50 gallons of solution assaying 28 grams per liter $NH_3$ and 55 grams per liter of ammonium sulfate. This solution was recirculated through the bed of copper on the launder 1 by continuous return of the solution from the tank 2. The solution flowed by gravity at sufficient velocity to wash the insoluble film from the surface of the copper into the tank. Initially two hours circulation over the copper was required to saturate the solution with cupric ion, after which the formation of the film began and continued at an even rate to the end of the run. The pump 3 was run in this manner for 10 hours when the process was stopped, and 35 pounds of the basic copper ammonium sulfate was recovered. During the operation, the several reagents were added to maintain approximately the initial concentration of the reagents in the solution. The operation was carried out at normal room temperature, the temperature of the solution in the tank varying between a maximum of 95° and 68° F. The product was of an extremely fine and uniform particle size, generally in the range of about 5 microns or less.

In another operation, a pound of scrap copper wire was placed in a two liter flask. Twelve hundred cc. of a solution of the composition indicated in Table 1 were circulated at the rate of three liters per minute under a ten-foot discharge head to agitate the copper wire. Further details and the result are given in Table 1 below.

*Table 1*

| Run No. | Solution, Grams per liter | | Pumping Time | | Yield | Color | Product Analysis | | |
|---|---|---|---|---|---|---|---|---|---|
| | $NH_3$ | $(NH_4)_2SO_4$ | Hrs. | Min. | | | Per Cent Cu | Per Cent S | Per Cent $NH_3$ |
| 1 | 6.1 | 31.6 | 4 | 20 | small | blue-green | 54.4 | 2.5 | 2.1 |
| 2 | 14.0 | 31.0 | 3 | 00 | good | blue | 49.8 | 5.42 | 7.82 |
| 3 | 18.0 | 30.5 | 3 | 10 | do | do | 49.4 | 5.90 | 7.67 |
| 4 | 22.4 | 30.0 | 2 | 50 | do | do | 49.0 | 6.15 | 7.09 |
| 5 | 28.2 | 29.0 | 2 | 50 | do | do | 48.0 | 5.90 | 6.08 |
| 6 | 34.4 | 29.1 | 4 | 00 | small | blue-grey | 51.0 | 5.16 | 7.76 |
| 7 | 38.9 | 28.1 | 4 | 15 | do | blue-green | 63.5 | 0 | 0 |
| 8 | 51.3 | 26.9 | 2 | 50 | do | do | 64.2 | 0 | 0 |

It will be noted that run 6 is at the approximate division line between the relative proportions of NH$_3$ and (NH$_4$)$_2$SO$_4$. It is also apparent that where the relative proportion of NH$_3$ is varied from about 30% to about 50% of the (NH$_4$)$_2$SO$_4$ and NH$_3$ present, the analysis of the product was substantially constant (runs 2–5). Where the ammonium sulfate constitutes less than about half the total active reagent (runs 7 and 8), the product is copper hydroxide. As a matter of fact, if ammonium sulfate be completely omitted, and the ammonia used in slightly greater concentrations, the product is copper hydroxide while the speed of reaction and yield are substantially the same.

From the table, it will also be seen that the amount of NH$_3$ in solution varied between 0.6 and 5.1%, while the (NH$_4$)$_2$SO$_4$ varied from 3.16 to 2.7%, both based on total amount of solution. I have found that the process is satisfactory with the NH$_3$ content of the solution between about 0.5% and about 6.0%, with an optimum at about 3% NH$_3$, determined largely by considerations of speed of reaction and avoidance of ammonia loss. With regard to the relation between the reagents, the basic copper ammonium sulfate is produced when the weight of NH$_3$ present is from about 20% to about 50% of the total, with an optimum at about 35% NH$_3$ based on total NH$_3$ plus (NH$_4$)$_2$SO$_4$.

It is preferred to operate with an ammonia to ammonium sulfate ratio of less than about one to five because when one operates, for example, with one part by weight of ammonia to six of ammonium sulfate, the yield is low and the product is gelatinous and difficult to filter. When the ammonia to ammonium sulfate ratio is increased and is one to five and as much as one to one, the product is secured in good yield and is easily filtered.

It is preferred to operate with ammonium sulfate present because the product, particularly the basic copper ammonium sulfate, is less sensitive to the temperature of operation and less oxide is formed in the product.

One can use air or any readily available source of oxygen. Only enough oxygen is required to insure the formation of the cupric ion in the solution. Any suitable copper can be utilized so long as it provides adequate surface for contact with the solution.

The violence of contact of the solution and the copper should be such as to break loose the copper compound film from the copper; if the agitation is relatively gentle, the particles are relatively large and thick. They are more insensitive to temperature and to the solution so they can remain longer and are less affected by temperature, enabling temperatures above 85° F. to be employed.

I claim:

1. As a new compound, a basic copper ammonium sulfate having substantially the composition corresponding to the formula Cu(NH$_3$)$_3$SO$_4$·4Cu(OH)$_2$·XH$_2$O where X is of a value from about 0.4 to 2.

2. A continuous process for the manufacture of basic copper ammonium sulfate, comprising bringing a material consisting essentially of an aqueous solution of ammonia saturated with cupric copper and containing about ½% to 6% dissolved ammonia and from about 2% to 4% (NH$_4$)$_2$SO$_4$ into contact with copper bodies in the presence of available oxygen, thereby forming insoluble films of basic copper ammonium sulfate on the copper, while agitating said copper bodies so as to separate at least portions of the films from the bodies and to expose fresh metallic copper surfaces to the action of the material, and recovering the separated basic copper ammonium sulfate.

3. A continuous process for the manufacture of basic copper ammonium sulfate comprising passing a material consisting essentially of an aqueous solution of ammonia saturated with cupric copper and containing about ½% to 6% dissolved ammonia and (NH$_4$)$_2$SO$_4$ over copper bodies in the presence of available oxygen, thereby forming insoluble films of basic copper ammonium sulfate on the copper, while agitating said copper bodies with sufficient violence to separate at least portions of the film from the bodies and to expose fresh metallic copper surfaces to the action of the material, and recovering the separated basic copper ammonium sulfate, the ammonia and the ammonium sulfate being present in the solution in such amounts that the relative proportions between them is from about 1 to 5 to 1 to 1 on a weight basis.

4. A continuous process for the manufacture of basic copper ammonium sulfate comprising passing a material consisting essentially of an aqueous solution of ammonia saturated with cupric copper and containing about ½% to 6% dissolved ammonia and from about 2% to 4% (NH$_4$)$_2$SO$_4$ over copper bodies in the presence of available oxygen, thereby forming insoluble films of basic copper ammonium sulfate on the copper, while agitating said copper bodies with sufficient violence to separate at least portions of the film from the bodies and to expose fresh metallic copper surfaces to the action of the material, and recovering the separated basic copper ammonium sulfate, the weight of the ammonia present in the solution being greater than the weight of the ammonium sulfate present in the solution.

PERCY JOHN ROWE.

REFERENCES CITED

The following references are of record in the file of this patent:

UNITED STATES PATENTS

| Number | Name | Date |
| --- | --- | --- |
| 682,232 | Beck 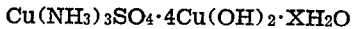 | Sept. 10, 1901 |

OTHER REFERENCES

J. W. Mellor's "A Comprehensive Treatise on Inorganic and Theoretical Chemistry," vol. 3, pp. 88, 252–253. Longmans, Green and Co., N. Y., Publishers.

"Gas Analysis" by L. M. Dennis, 1929 ed., page 185, top; MacMillan Co., N. Y., Publishers.